Figure 1:
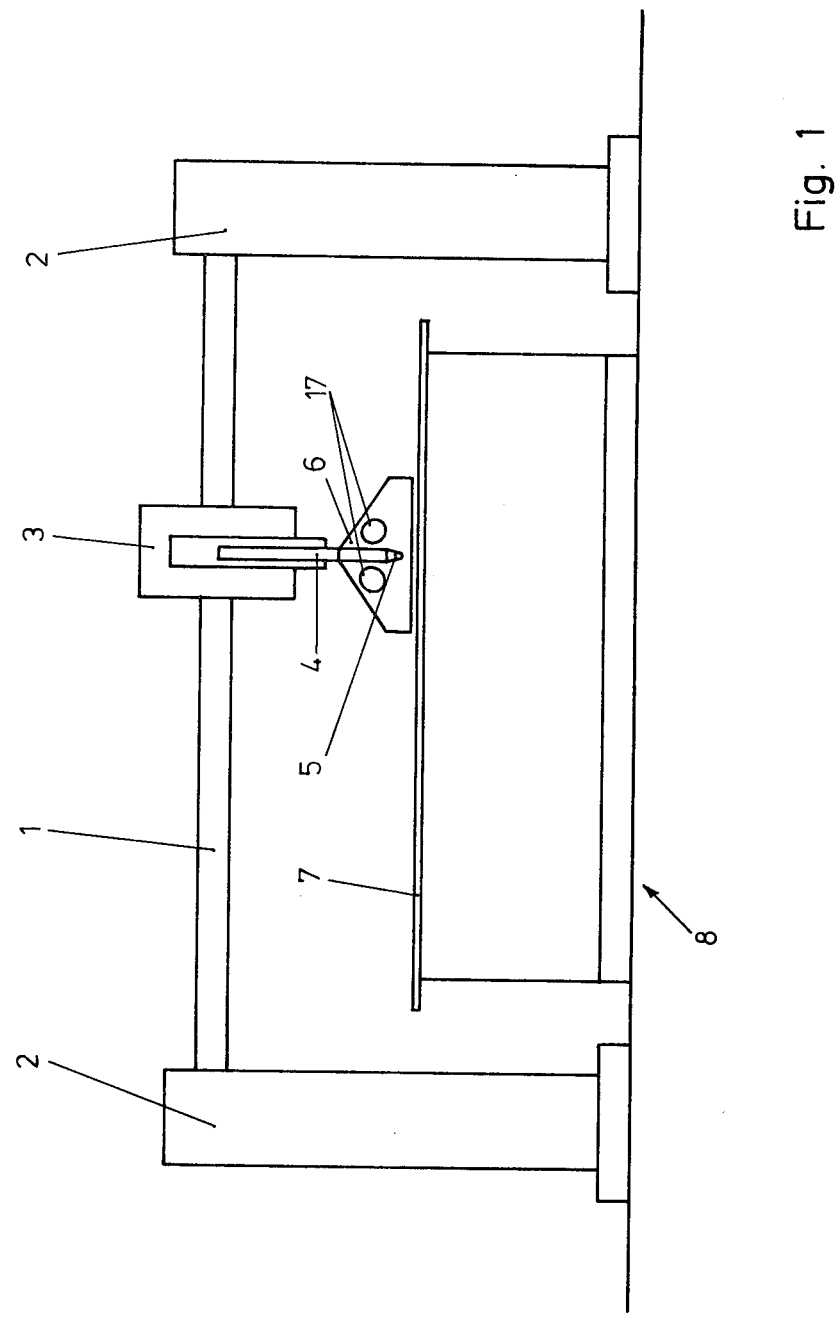

United States Patent [19]

Ackermann et al.

[11] 4,438,316
[45] Mar. 20, 1984

[54] NOISELESS COMBUSTION AND PLASMA CUTTING ARRANGEMENT

[75] Inventors: Ulrich Ackermann; Eggo Ratsch, both of Berlin, Fed. Rep. of Germany

[73] Assignee: Versuchsanstalt f. Deutsche Forschungs-u Luft-u Raumfahrt e.V, Cologne, Fed. Rep. of Germany

[21] Appl. No.: 319,365

[22] Filed: Nov. 9, 1981

[30] Foreign Application Priority Data

Nov. 10, 1980 [DE] Fed. Rep. of Germany ....... 3042347

[51] Int. Cl.³ ................................................. B23K 9/00
[52] U.S. Cl. ........................... 219/121 PC; 219/121 P; 219/121 P X; 219/159; 269/289 R
[58] Field of Search ................... 219/121 PC, 121 PH, 219/121 P, 121 PY, 159, 76.16; 269/302, 302.1, 289 R; 228/47, 49

[56] References Cited

U.S. PATENT DOCUMENTS

4,063,059 12/1977 Brolund et al. .............. 219/121 PC
4,097,713 6/1978 Dunshee ....................... 219/121 PC

FOREIGN PATENT DOCUMENTS

2505665 8/1976 Fed. Rep. of Germany ... 219/121 P
2648327 10/1978 Fed. Rep. of Germany ... 219/121 P

*Primary Examiner*—M. H. Paschall
*Attorney, Agent, or Firm*—Max Fogiel

[57] ABSTRACT

The invention relates to a noiseless combustion and plasma cutting arrangement with a cutter and an associated gridiron- or honeycomb-type bench that is divided into individual cells that are higher than they are wide to reduce the noise that occurs during cutting.

11 Claims, 7 Drawing Figures

NOISELESS COMBUSTION AND PLASMA CUTTING ARRANGEMENT

Combustion cutting arrangements are used to cut low-alloy steel pieces up to 300 mm thick. Plasma cutting arrangements are able to cut high-alloy steels, non-ferrous metals, and, under certain conditions, even non-metal materials approximately as thick as 100 mm.

The noise that accompanies combustion and plasma cutting can be mainly ascribed to two sources, one above the workpiece and one under it. In known combustion cutting arrangements it is the source under the workpiece, which echoes against the floor for example, that dominates the half space above the workpiece. In plasma cutting the source above the workpiece dominates. The invention described herein is concerned with the reduction of both types of noise.

German Pat. No. 2 648 327 discloses a combustion cutting arrangement of the type described above. The inside and outside of the cells in its gridiron-type bench, however, have noise-absorbent elements that constitute a soundproof cladding. The cells are relatively short and can be extended to varying lengths by a sliding component mounted like a bottom covering. The noise-absorbing elements, which can be removed from and replaced on the cells of the gridiron-type bench are essentially plates of rock wool covered on both sides with a perforated sheet, wire netting, or a similar material. This known combustion cutting arrangement also has a torch with a sound-insulating cover. The drawback of the known arrangement is that hot particles of molten metal and slag thrown off during cutting clog and destroy the noise-absorbent elements, reducing and eventually doing away with their effect. To counteract this problem the elements must be replace frequently. Their short life adds to the expense of maintaining the arrangement. The benches themselves are also very expensive to manufacture.

A plasma cutting arrangement in which the intensity of the noise that derives from the source above the workpiece is reduced by equipping the torch with a noise-insulating device is known from German Offenlegungsschrift No. 2 415 655. This device is mounted on the torch near the gas exit, where it screens any concomitant noise from the environment. Since most of the noise encountered in combustion cutting derives from the half space below the workpiece, the maximum decrease in the sound level that can be attained by a device mounted on the torch is 2 dB(A). If the device is mounted so low on the torch that not enough ambiant air can flow between the bottom of the device and the surface of the workpiece, the cutting quality will be inferior because the gas mixture will not contain enough oxygen for complete combustion. Mounting such a noise-insulating device on a plasma cutter on the other hand will reduce the noise level by no more than 5 dB(A). The noise level at the ear of an operator using an ordinary plasma system is about 105 dB(A). A noise-insulating device on the torch will reduce the level to about 100 dB(A). This does so little for the operator that it does not justify the resulting interference with his line of vision. The operator must at any rate also wear a personal noise-protection device like ear protectors or plugs.

A plasma cutting arrangement known from U.S. Pat. No. 3,851,864 cuts a workpiece submerged in a water bath. The water is intended to decrease the noise that accompanies the cutting. A cylindrical jacket surrounds the nozzle of the torch and emits a stream of water that surrounds the cutting jet, screening its noise from the environment. This known plasma cutting arrangement is especially expensive. The interaction of cutting jet and water generates additional noise, so that the resulting noise reduction is very slight.

German Offenlegungsschrift No. 2 505 665 discloses a plasma cutting arrangement in which the operation is carried out in a liquid bath in which both workpiece and torch are immersed. This bath likewise prevents the noise of the cutting process from escaping into the environment. This known arrangement is also extremely expensive. A workpiece being combustion cut can of course also be immersed in a water bath in principle, although carbon steels will harden along the cut under these conditions, resulting in a change in material properties and susceptibility to cracking. Slag and molten metal will also accumulate along the bottom of the cut, necessitating further processing. Finally, since the interaction of the cutting jet and the water will itself be noisy, the total noise level will be diminished only slightly.

The purpose of the invention is to reduce the noise generated by combustion and plasma cutting arrangements of the type described in the introduction and hence to decrease the acoustic stress to which the operator is subjected. In accomplishing this purpose the gridiron-type bench is to be designed to comply with quite specific demands and the comfort of the operator is to be in no way diminished.

This purpose is achieved in accordance with the invention in that the walls of the cells in the bench are made out of a reverberating material and in that the cells are deep enough in relation to their axis to permit multiple reflections against the reverberating walls. The invention does not rely on sound absorption through sound-insulating materials as in prior art, but lets the sound die by means of multiple reflection. For this, the cells must have a significant vertical axial depth. The reverberating material of the walls makes it possible to do without the noise-absorbent elements that have proven so expensive to maintain. The design of the cells in accordance with the invention decreases the sound source in the half space below the workpiece to such an extent that it will practically no longer contribute to the total noise level. The walls completely enclose the cells, which are open only at the top and bottom. The workpiece rests on the top of the bench, which is itself composed of the top of the walls. The cells extend essentially throughout the total height of the bench, from the top on which the workpiece rests down to close to the floor. Appropriate reverberating materials for the walls are steel, aluminum, and other metal sheets, tubes, or sections. Such shapes considerably reduce the cost of manufacturing such a bench. The cross-section of the cells can be round, rectangular, hexagonal, or any shape desired.

A receptacle, especially a movable receptacle, can be placed under the bench and extending over its whole floor area to catch slag and pieces of molten metal that fall through the cells. The bench and to some extent the receptacle can be enclosed by side walls extending over their full height to help prevent noise from escaping into the lower half space and hence also into the upper half space. The gap left between the receptacle and the bench when the former is slid under the latter can be closed off with a wall mounted on the receptacle in order to enclose both bench and receptacle completely.

The cells or walls of the cells, or, if the cells are constructed in two section, the sections at the top of the bench on which the workpiece rests in particular, can be replaced individually or as a whole, always with a reverberating material.

To decrease the noise even more, the top of the bench will be covered at least partly by the workpiece itself and can also be covered at the cutting site by an antinoise hood of a known type in the form of a suction extraction funnel. The primary function of this hood is to combat noise in the upper half space but will also have a reciprocal effect against the low level of noise that escapes up through the cutting site from the lower half space. The antinoise hood can be constructed so that it can be lowered to just above the workpiece and can have windows so that the operator's line of sight will be unobstructed. There can be an eye-protection filter covering or swinging down over at least one window to provide safe visual access for controlling the workpiece during cutting.

A gridiron-type bench in accordance with the invention will reduce the noise levels encountered in combustion cutting by up to 10 dB(A) at the operator's ear in comparison with known benches. Since the sound source under the workpiece is practically eliminated, the level in the workplace as a whole will also be drastically reduced, so that other workers in the same environment will also be subjected to significantly less noise. If a low-noise cutting torch is also used with the bench in accordance with the invention, the sound level can be reduced by another 5 dB(A). An antinoise hood on the torch will further reduce the sound level by another 10 dB(A). Using the three devices together will thus reduce the sound level by at least 20 dB(A).

That the antinoise hood is also a suction extraction funnel results in another advantage to the invention. Pollutants like gases, dust, and smoke that are produced when the workpiece is being cut can be removed simply and economically because only the small area under the antinoise hood will have to be cleared. Since the antinoise hood must be positioned close enough to the workpiece for maximal noise suppression, it, or its attachment to the torch, will be perforated to allow the torch to draw in the ambient air necessary for complete combustion.

The main source of noise in plasma cutting is above the workpiece. The bench in accordance with the invention by itself will therefore reduce the sound level only slightly. Together with the antinoise hood it can attain a decrease of more than 15 dB(A) at the operator's ear, whereas a conventional plasma cutting arrangement with an antinoise hood will result in a reduction of no more than 5 dB(A). Thus, the bench in accordance with the invention in conjunction with an antinoise hood can reduce the noise level at the operator's ear from 105 dB(A) for example to less that 90 dB(A). Since he will need no personal antinoise protection, the hood's interference with his line of vision, which can be significantly reduced at any rate by installing windows in the hood without in any way decreasing its acoustical effect, will be justified. It is in plasma cutting in particular that the antinoise hood with its supplementary function of extracting pollutants will be most desirable because the volume under the hood that has to be cleared is much smaller than the total volume of the workplace, which means that the extractor can be much smaller.

Figure 2:
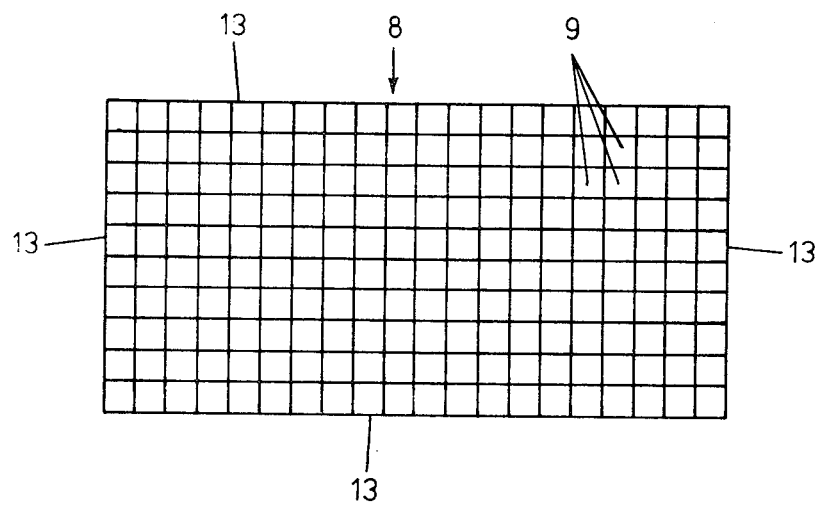
Figure 3:
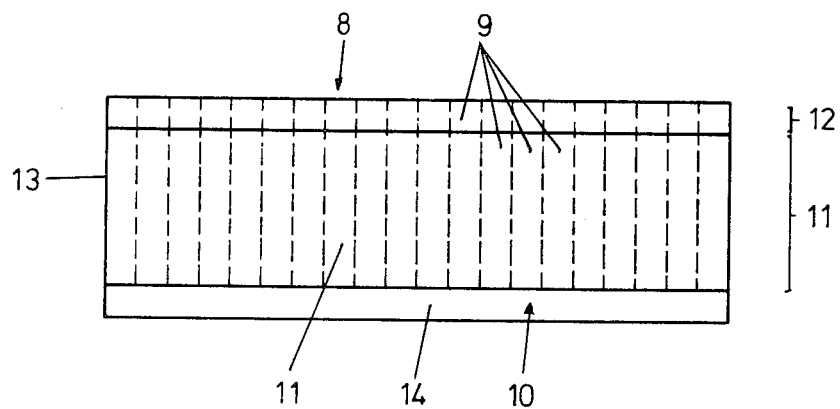
Figure 4:
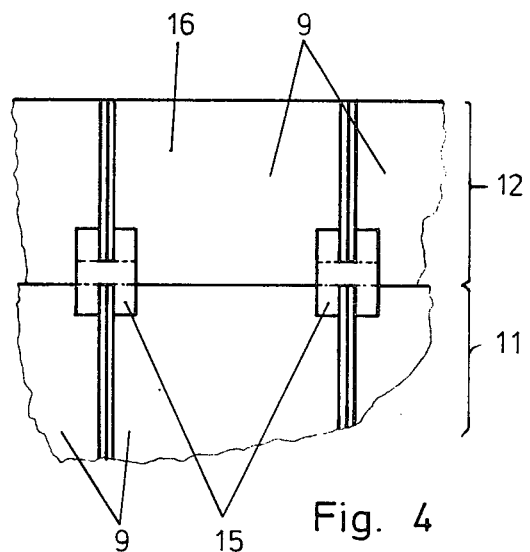
Figure 5:
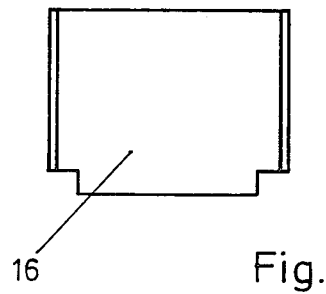
Figure 6:
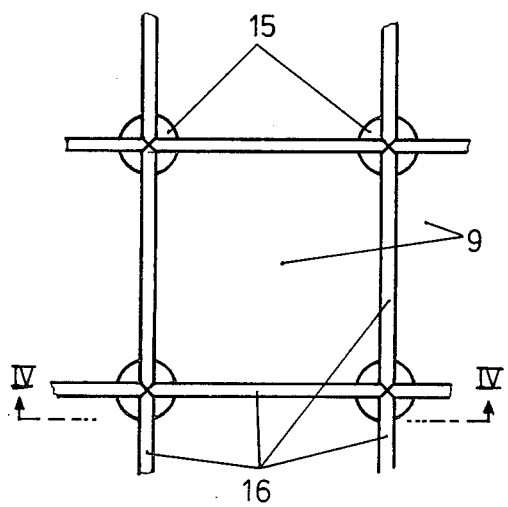

A preferred embodiment of the invention will now be specified with reference to the drawings, in which:

FIG. 1 is a schematic front view of the cutting arrangement,

FIG. 2 a top view of the gridiron- or honeycomb-type bench,

FIG. 3 a front view of the bench,

FIG. 4 a detail of the bench,

FIG. 5 a view of a cell wall,

FIG. 6 a top view of one cell and part of the surrounding cells, and

Figure 7:
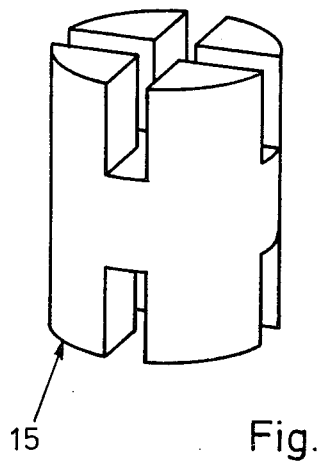

FIG. 7 a perspective view of a removable wall-end connector.

The cutting arrangement shown in FIGS. 1 through 3 has a cutter carriage 3 that travels along a bar 1 between two uprights 3 and carries a torch 4 with a jet 5 that is covered by an antinoise hood 6 to decrease the level of noise in the half space above the workpiece 7. Workpiece 7 may be a piece of sheet metal for example. It rests on a bench 8 made up essentially of a number of vertically oriented cells 9 like those in a honeycomb. Cells 9 can be formed by walls 16 of a reverberating material or can be lengths of section, tubing, or pipe with a cross-section of any shape. It is vital that each cell have a closed cross-sectional periphery, be made out of a reverberating material like steel or aluminum, and be significantly deeper than wide, so that the sound generated below the workpiece will repeatedly reflect against the inside surface of the cells and die. Vertical cells 9 are deep enough to extend almost the total height of bench 8, from its top surface almost to the floor. Below cells 9 is a waste receptacle 10 for slag and pieces of molten metal. Some or all of cells 9 may or may not be replaceable or be made in two sections with those at the bottom 11 fixed and those at the top 12 replaceable. Bench 8 is completely enclosed by peripheral walls 13, which insulate it acoustically. It is practical for waste receptacle 10 to be movable so that it can be slid out from under bench 8 for emptying. If so, one of its sides will have a low wall 14 to close off the gap left between receptacle 10 and bench 8 when the former is slid under the latter.

FIGS. 4 through 7 show details of one embodiment of bench 8 in which the cells are made in two sections and formed by walls. FIG. 4 is a sectional view along the line IV—IV in FIG. 6. The cell sections 9 at the bottom 11 are formed by connected walls 16. The walls are fastened together at their intersections with removable connectors 15. The top and bottom of each connector 15 have intersecting slots. The top corners of the walls fit into the slots on the bottom of connectors 15 and more walls are inserted over them with their bottom corners fitting into the slots on the top of the connectors to form the cell sections at the top 12 of the bench. FIG. 5 shows the shape of such a wall. Cells 9 may of course have different forms, consisting of vertically mounted lengths of profile, tubing, or pipe, and may or may not be replaceable.

During either combustion or plasma cutting, workpiece 7 is layed on table 8 and fastened if necessary, cutter carriage 3 brought into operating position, and torch 4 or the antinoise hood 6 that is mounted on it lowered to just above the upper surface of the workpiece. The site at which the workpiece is being cut and the torch or its jet 5 can be viewed or manipulated or both through windows 17.

We claim:

1. Low-noise flame and plasma arc cutting arrangement, comprising: cutting means above an associated honeycomb-type bench for supporting a workpiece, said bench being divided into a plurality of individual cells that are substantially higher than they are wide for reducing noise occurring during cutting of the workpiece; said cells in the bench having walls comprising reverberating material; said cells having a depth for permitting multiple reflections of sound against said walls of reverberating material so that sound generated below the workpiece is repeatedly reflected against the inside surface of the cells and become thereby diminished, said walls being substantially free of sound absorbing material, noise reduction occurring by said multiple reflections of sound.

2. Flame and plasma arc cutting arrangement as defined in claim 1, wherein said cells have a closed cross-sectional periphery and are open only at the top and bottom.

3. A cutting arrangement as defined in claim 1, wherein said cells extend throughout the total height of the bench from the top of the bench on which the workpiece rests down to near the floor.

4. A cutting arrangement as defined in claim 1, including a waste receptacle movable under the bench to catch slag and pieces of molten metal falling through the cells.

5. A cutting arrangement as defined in claim 4, wherein said cells are enclosed by continuous vertical peripheral walls, said waste receptacle being at least partially enclosed by said vertical peripheral walls.

6. A cutting arrangement as defined in claim 4, wherein a gap is left between said waste receptacle and said bench when said receptacle is slid under the bench, said gap being closable by a wall mounted on the receptacle for enclosing both bench and receptacle completely.

7. A cutting arrangement as defined in claim 1, wherein at least part of the cells are replaceable.

8. A cutting arrangement as defined in claim 1, including antinoise hood means covering the cutting site at top of the bench, the top of the bench being covered at least partly by the workpiece and also at the cutting site by said hood means, said hood means comprising a suction extraction funnel.

9. A cutting arrangement as defined in claim 8, wherein said antinoise hood means is lowerable substantially above the workpiece, said hood means having window means for viewing the cutting site.

10. A cutting arrangement as defined in claim 9, including eye-protection filter means covering at least partly said window means.

11. A cutting arrangement as defined in claim 1, wherein said cells have a closed cross-sectional periphery and are open only at the top and bottom, said cells extending throughout the total height of the bench from the top of the bench on which the workpiece rests down to near the floor, a waste receptacle under the bench to catch slag and pieces of molten metal falling through the cells, said cells being enclosed by continuous vertical peripheral walls, said waste receptacle being at least partially enclosed by said vertical peripheral walls, a gap being left between said waste receptacle and said bench when said receptacle is slid under the bench, said gap being closable by a wall mounted on the receptacle for enclosing both bench and receptacle completely, at least part of the cells being replaceable, antinoise hood means covering the cutting site at top of the bench, the top of the bench being covered at least partly by the workpiece and also at the cutting site by said hood means, said hood means comprising a suction extraction funnel said antinoise hood means being lowerable substantially above the workpiece, said hood means having window means for viewing the cutting site, and eye protection filter means covering at least partly said window means.

* * * * *